United States Patent
Ishihara et al.

(10) Patent No.: US 8,891,555 B2
(45) Date of Patent: Nov. 18, 2014

(54) SPATIAL MULTIPLEXING WIRELESS TRANSMISSION SYSTEM, SPATIAL MULTIPLEXING WIRELESS TRANSMISSION METHOD AND COMPUTER PROGRAM

(75) Inventors: Koichi Ishihara, Yokosuka (JP); Yasushi Takatori, Yokosuka (JP); Yusuke Asai, Yokosuka (JP); Riichi Kudo, Yokosuka (JP); Wenjie Jiang, Yokosuka (JP); Tomoyuki Yamada, Yokosuka (JP); Masato Mizoguchi, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 95 days.

(21) Appl. No.: 13/579,220

(22) PCT Filed: Feb. 24, 2011

(86) PCT No.: PCT/JP2011/054166
§ 371 (c)(1),
(2), (4) Date: Aug. 15, 2012

(87) PCT Pub. No.: WO2011/105500
PCT Pub. Date: Sep. 1, 2011

(65) Prior Publication Data
US 2012/0307739 A1 Dec. 6, 2012

(30) Foreign Application Priority Data
Feb. 25, 2010 (JP) .................. 2010-040359

(51) Int. Cl.
*H04J 3/24* (2006.01)
*H04B 7/06* (2006.01)
*H04B 7/08* (2006.01)
*H04B 7/04* (2006.01)
*H04B 7/10* (2006.01)

(52) U.S. Cl.
CPC ............ *H04B 7/0691* (2013.01); *H04B 7/0834* (2013.01); *H04B 7/0874* (2013.01); *H04B 7/0452* (2013.01); *H04B 7/10* (2013.01); *H04B 7/0877* (2013.01)
USPC ............ 370/474; 370/534; 370/539; 370/312

(58) Field of Classification Search
USPC .......................... 370/312, 339, 474, 536, 539
See application file for complete search history.

(56) References Cited

U.S. PATENT DOCUMENTS

| 7,532,599 | B2 * | 5/2009 | Kim et al. ..................... 370/334 |
| 8,351,544 | B2 * | 1/2013 | Mondal et al. ................ 375/299 |

(Continued)

FOREIGN PATENT DOCUMENTS

| EP | 1 487 140 A1 | 12/2004 |
| JP | 2004-120730 A | 4/2004 |

(Continued)

OTHER PUBLICATIONS

Morikura and Kubota, "802.11 High-speed Wireless LAN Textbook", Impress R & D Publishing, Apr. 2008, pp. 243-247.

(Continued)

*Primary Examiner* — Phuc Tran
(74) *Attorney, Agent, or Firm* — Harness, Dickey & Pierce, P.L.C.

(57) ABSTRACT

A spatial multiplexing wireless transmission system is formed by a base station, and by a plurality of terminal stations that are provided with a plurality of antennas. The base station is provided with an information signal generating portion, a control signal generating portion, a transmission frame generating portion, a multiple beamforming portion, a transmission/reception switching portion, a reception signal processing portion, a propagation environment estimating portion, and an antenna information generating portion. At least one of the terminal stations is provided with a transmission/reception switching portion, a reception signal processing portion, a decoding portion, an antenna information extracting portion, an antenna information generating portion, an transmitting portion, a battery, a remaining battery detecting portion, a transmission request extracting portion, and a propagation environment estimating portion.

15 Claims, 8 Drawing Sheets

(56) References Cited

U.S. PATENT DOCUMENTS

| | | |
|---|---|---|
| 2005/0197080 A1 | 9/2005 | Ulupinar et al. |
| 2005/0249180 A1 | 11/2005 | Murakami et al. |
| 2006/0063492 A1 | 3/2006 | Iacono et al. |
| 2007/0281746 A1 | 12/2007 | Takano et al. |
| 2008/0008134 A1* | 1/2008 | Satou et al. .................. 370/334 |
| 2008/0267108 A1* | 10/2008 | Zhang et al. .................. 370/312 |
| 2008/0267197 A1 | 10/2008 | Ahmadyar et al. |
| 2009/0207929 A1 | 8/2009 | Murakami et al. |
| 2009/0303941 A1 | 12/2009 | Naka et al. |
| 2010/0040160 A1 | 2/2010 | Murakami et al. |
| 2010/0284481 A1 | 11/2010 | Murakami et al. |
| 2010/0310005 A1* | 12/2010 | Takagi et al. ................. 375/295 |

FOREIGN PATENT DOCUMENTS

| | | |
|---|---|---|
| JP | 2008-017096 A | 1/2008 |
| JP | 2008-092433 A | 4/2008 |
| JP | 2008-098940 A | 4/2008 |
| KR | 10-2008-0084313 A | 9/2008 |
| KR | 10-2009-0093388 A | 9/2009 |
| WO | 2007/023809 A1 | 3/2007 |
| WO | 2009/040678 A2 | 4/2009 |

OTHER PUBLICATIONS

Q.H. Spencer, A.L. Swindlehurst, and M. Haardt, "Zero-Forcing Methods for Downlink Spatial Multi-plexing in Multiuser MIMO Channels," IEEE Trans. Sig. Processing, vol. 52, No. 2, Feb. 2004, pp. 461-471.

IEEE 802.11n (standard), Oct. 29, 2009.

International Search Report and Written Opinion of the ISA for PCT/JP2011/054166, ISA/JP, mailed Mar. 22, 2011.

Search Report, European Patent Application No. 11747460.1, Oct. 8, 2013.

Office Action, Chinese Patent Application No. 201180009830.5, Jul. 31, 2014.

\* cited by examiner

SPATIAL MULTIPLEXING WIRELESS TRANSMISSION SYSTEM, SPATIAL MULTIPLEXING WIRELESS TRANSMISSION METHOD AND COMPUTER PROGRAM

CROSS REFERENCE TO RELATED APPLICATIONS

This application is a 371 U.S. National Stage of International Application No. PCT/JP2011/054166, filed Feb. 24, 2011. This application claims the benefit of Japanese Patent Application No. 2010-040359, filed Feb. 25, 2010. The disclosures of the above applications are incorporated herein by reference.

TECHNICAL FIELD

The present invention relates to a spatial multiplexing wireless transmission system, a spatial multiplexing wireless transmission method, and a computer program.

Priority is claimed on Japanese Patent Application No. 2010-040359, filed Feb. 25, 2010, the contents of which are incorporated herein by reference.

BACKGROUND ART

Conventionally, a spatial multiplexing transmission method that uses beamforming which is employed as an option for IEEE 802.11n is known as a method in which a single base station performs communication with multiple terminal stations. In this method, the base station transmits known signals that are mutually different in each beamforming within the transmission signal. Upon receiving these, by calculating a complex correlation value between the reception signal and the known signal in a known signal segment, each terminal station makes a transfer function estimation for each beamforming and for all of the antennas that are used by the terminal stations for receiving. Based on the results of these transfer function estimations, the signals that were spatially multiplexed on the transmitting side are demultiplexed on the receiving side.

The method used to demultiplex the signals in the terminal stations may be, for example, a Zero-Forcing (ZF) method in which complete interference rejection is performed, a Minimum-Mean-Squared-Error (MMSE) method in which the sum of the interference and the noise power on the receiving side is minimized, or a Maximum-Likelihood-Detection (MLD) method which is a maximum likelihood method (see, for example, Non-patent document 1 and Non-patent document 2).

Generally, when spatial multiplexing transmissions are used, there are frequently cases in which the number of spatially multiplexed signals being received by each terminal station is less than the number of reception antennas of each terminal station. At such times, by decreasing the number of antennas used in the processing of the reception signals, it is possible to greatly reduce the power consumption and the amount of signal processing in the receiving station. Here, in order to decrease the number of antennas used for reception in the terminal stations, it is necessary for the base station to select the antennas that are to be used for reception in a terminal station, and, in accordance with this selection, to perform beamforming such that the transmission signals to a particular terminal station are prevented from interfering with other base stations.

[Non-patent document 1] '802.11 High-speed Wireless LAN Textbook', Morikura and Kubota, Impress R & D Publishing, April 2008

[Non-patent document 2] 'Zero-Forcing Methods for Downlink Spatial Multiplexing in Multiuser MIMO Channels', Q.H. Spencer, A.L. Swindlehurst, and M. Haardt, IEEE Trans. Sig. Processing, Vol. 52, No. 2, February 2004, pp. 461-471.

DISCLOSURE OF INVENTION

Here, in the spatial multiplexing wireless transmission procedure of a conventional spatial multiplexing wireless transmission system, in the antennas selected by the base station, the base station performs control such that there is no interference from transmissions to other terminal stations, however, in antennas that were not selected, there have been cases when there has been interference from transmissions to other terminal stations with a consequent reduction in the transmission quality. As a result, when a base station is communicating simultaneously with multiple terminal stations, there have been cases when it has not been easy for the terminal station to detect which antenna it should use for receiving. Accordingly, there have been instances when it has not been easy for the base station to select the antennas to be used for receiving in the terminal stations. Because of this, in many cases, there has been no great decrease in the amount of signal processing and power consumption in a terminal station at the same time as superior transmission characteristics are being maintained.

A spatial multiplexing wireless transmission system and a spatial multiplexing wireless transmission method that are able to considerably reduce the amount of signal processing and power consumption in a terminal station at the same time as they enable superior transmission characteristics to be maintained is generally desired from the above-described conventional technology.

The present invention has, for example, the following aspects.

A first aspect of the present invention is a spatial multiplexing wireless transmission system having a base station that communicates with multiple terminal stations, and a first terminal station that is included among the multiple terminal stations and that has multiple antenna elements, wherein the base station is provided with a first antenna information generating portion that, when data to be transmitted to the first terminal station is input from the outside, generates antenna information showing which of the multiple antenna elements is to be used to receive information signals, and then transmits the antenna information to the first terminal via a transmitting/receiving portion, and wherein the first terminal station is provided with: transmission/reception switching and reception processing portions that are provided individually for each one of the multiple antenna elements, and that switch between transmitting and receiving information signals and also perform reception processing; and a control portion that receives the antenna information via the multiple antenna elements, and based on the antenna information, selects at least one antenna element from among the multiple antenna elements which is to be used to receive information signals, and then sets the transmission/reception switching and reception processing portions that correspond to the selected antenna elements to a receiving mode, and sets the transmission/reception switching and reception processing portions that correspond to the antenna elements that were not selected to a non-receiving mode.

A second aspect of the present invention is the above-described spatial multiplexing wireless transmission system wherein it is also possible for the base station to be further provided with: a control signal generating portion that generates transmission request signals requesting that the first terminal station transmit a propagation environment estimation signal, and then transmits the transmission request signal to the first terminal station via the transmitting/receiving portion; a first propagation environment estimating portion that, based on the propagation environment estimation signal received from the first terminal station, generates propagation environment information about the first terminal station; and a beamforming portion that, based on the antenna information that was generated by the first antenna information generating portion based on the propagation environment information, decides the transmission directionality while suppressing interference between the multiple terminal stations and performs beamforming, and then transmits the beamforming signal via the transmitting/receiving portion, and for the terminal stations to be further provided with: a transmitting portion that receives the transmission request signal via the multiple antenna elements, and generates the propagation environment estimation signal, and then transmits the propagation environment estimation signal to the base station via the multiple antenna elements; and a decoding portion that receives the transmitted beamforming signal via the antenna elements that correspond to the transmission/reception switching and reception processing portions that have been set to the receiving mode, and decode the transmitted beamforming signal so as to generate data, and then output the data to a playback portion.

A third aspect of the present invention is the above-described spatial multiplexing wireless transmission system wherein it is also possible for the terminal stations to be further provided with: a second propagation environment estimating portion that estimates a propagation environment using the transmission request signal, and then generates second propagation environment information; and a second antenna information generating portion that, based on the second propagation environment information, generates antenna specifying information specifying the antennas to be used to receive the antenna information from the base station, and then transmits the antenna specifying information to the base station via the multiple antenna elements, and for the first antenna information generating portion to generate the antenna information which corresponds to the antenna specifying information received via the transmitting/receiving portion.

A fourth aspect of the present invention is the above-described spatial multiplexing wireless transmission system wherein it is also possible for the first antenna information generating portion to generate at least one of information showing the center frequency used for a communication and information showing a transmission frequency band as the antenna information, and, based on at least one of the information showing the center frequency used for a communication and the information showing a transmission frequency band which were extracted from the antenna information, for the antenna control portion to control at least one of the center frequency and the transmission frequency band of the multiple antenna elements which have been set to either the receiving mode or the non-receiving mode.

A fifth aspect of the present invention is the above-described spatial multiplexing wireless transmission system wherein, based on the second propagation environment information, it is also possible for the second antenna information generating portion to generate as the antenna specifying information at least one of the order of priority and the number of antennas when it receives the antenna information from the base station, and to transmit the antenna specifying information to the base station via the multiple antenna elements, and, based on at least one of the order of priority of the antennas and the number of the antennas which are indicated in the antenna specifying information received via the transmitting/receiving portion, for the first antenna information generating portion to generate the antenna information.

A sixth aspect of the present invention is the above-described spatial multiplexing wireless transmission system wherein it is also possible for the terminal stations to be further provided with remaining battery detecting portions that generate remaining battery information by detecting the remaining battery level in the terminal stations, and then output this remaining battery information, and for the second antenna information generating portion to generate the antenna specifying information based on the remaining battery information.

A seventh aspect of the present invention is a spatial multiplexing wireless transmission method in a spatial multiplexing wireless transmission system having a base station that communicates with multiple terminal stations, and a first terminal station that is included among the multiple terminal stations and that has multiple antenna elements, which includes: a step in which, in the base station, antenna information showing which of the multiple antenna elements of the terminal stations are to be used to receive information signals from the base station is generated; a step in which the antenna information is transmitted to the terminal stations; a step in which the antenna information is received in the terminal stations; a step in which, based on the antenna information, the antenna elements to be used to receive the information signals are selected; and a step in which the selected antenna elements are set to a receiving mode, and the antenna elements that were not selected are set to a non-receiving mode.

An eighth aspect of the present invention is a computer program that, in a spatial multiplexing wireless transmission system having a base station that communicates with multiple terminal stations, and a first terminal station that is included among the multiple terminal stations and that has multiple antenna elements, is stored on a computer-readable non-temporary recording medium of the first terminal station, and that includes: a command that causes antenna information showing which of the multiple antenna elements of the terminal stations are to be used to receive information signals to be received from the base station; a command that causes the antenna elements to be used to receive the information signals to be selected based on the antenna information; and a command that causes the selected antenna elements to be set to a receiving mode, and the antenna elements that were not selected to be set to a non-receiving mode.

A ninth aspect of the present invention is a computer program that, in a spatial multiplexing wireless transmission system having a base station that communicates with multiple terminal stations, and a first terminal station that is included among the multiple terminal stations and that has multiple antenna elements, is stored on a computer-readable non-temporary recording medium of the first terminal station, and that includes: a command that causes antenna information showing which of the multiple antenna elements of the terminal stations are to be used to receive information signals from the base station to be generated; and a command that causes the antenna information is transmitted to the terminal stations.

Effects of the Invention

According to the above-described aspects, antenna information which is to be used to receive an information signal is generated by a base station and is contained within a control signal, and is then transmitted by the base station to a terminal station. The terminal station receives the control signal transmitted by the base station, and extracts the antenna information from the received control signal. The antenna information to be used to receive the information signal is then shared between the base station and the terminal station, and the terminal station either turns off, or else varies the operating clocks of the circuits that are connected to antennas that are not going to be used to receive the information signal. As a result, it is possible to select the antennas to be used in each terminal station, and to also greatly reduce the amounts of signal processing and power consumption in the terminal station, while at the same time maintaining superior transmission characteristics.

BEST EMBODIMENTS FOR CARRYING OUT THE INVENTION

Hereinafter, embodiments of the present invention will be described in detail using FIG. 1 through FIG. 9. Note that the present invention is not limited to these embodiments. Various modifications may be made to the following embodiments insofar as they do not depart from the scope of the technology of the present invention.

[First Embodiment]

Figure 1:
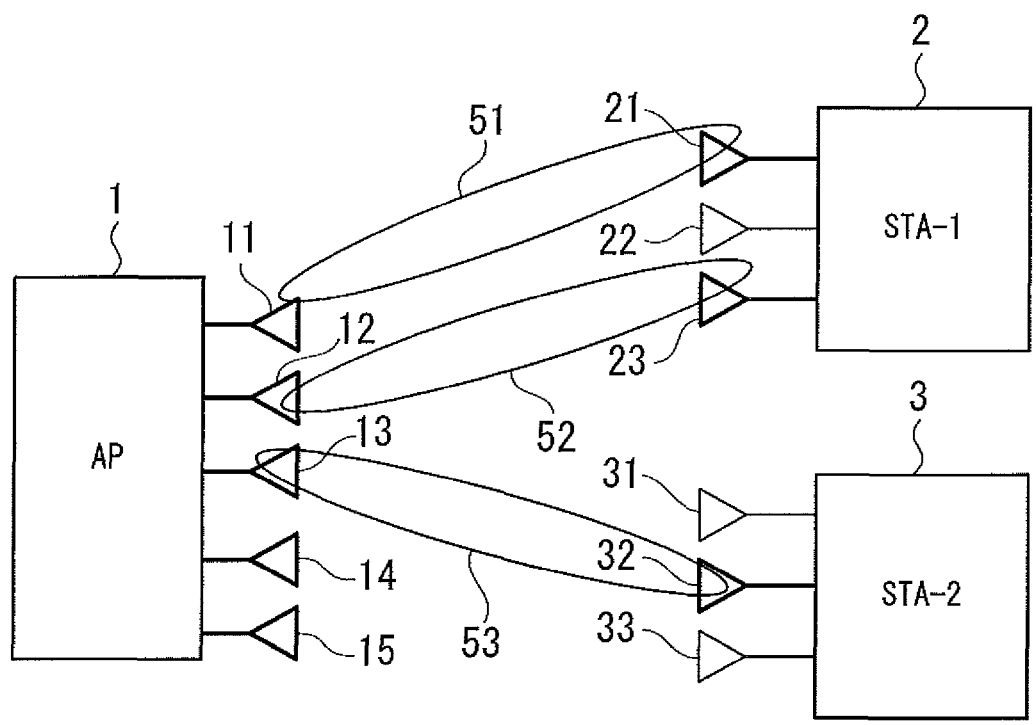
FIG. 1 is a view illustrating an operation of a spatial multiplexing wireless transmission system according to a first embodiment.

A first embodiment of the present invention will now be described using FIG. 1 through FIG. 5. Firstly, an outline of the first embodiment will be described using FIG. 1. FIG. 1 is a view depicting an operation of the spatial multiplexing wireless transmission system according to the first embodiment. As is shown in FIG. 1, a base station 1 is provided with multiple antennas 11 to 15. A first terminal station 1 (STA-1) is provided with multiple antennas 21 to 23, while a second terminal station 2 (STA-2) is provided with multiple antennas 31 to 33. A beamforming signal 51 that travels from the antenna 11 towards the antenna 21 of the first terminal station 1 is transmitted such that it does not interfere with the other antennas 22 and 23 of the first terminal station 1 or with the antennas 31 to 33 of the second terminal station 2. Moreover, a beamforming signal 52 that travels from the antenna 12 towards the antenna 23 of the first terminal station 1 is transmitted such that it does not interfere with the other antennas 21 and 22 of the first terminal station 1 or with the antennas 31 to 33 of the second terminal station 2. Furthermore, a beamforming signal 53 that travels from the antenna 13 towards the antenna 32 of the second terminal station 2 is transmitted such that it does not interfere with the antennas 21 to 22 of the first terminal station 1 or with the other antennas 31 and 33 of the second terminal station 2. In addition, the first terminal station 1 uses the antennas 21 and 23 for receiving, but does not use the antenna 22 for receiving. The second terminal station 2 uses the antenna 32 for receiving, but doesn't use the antennas 31 and 33 for receiving.

Figure 2:
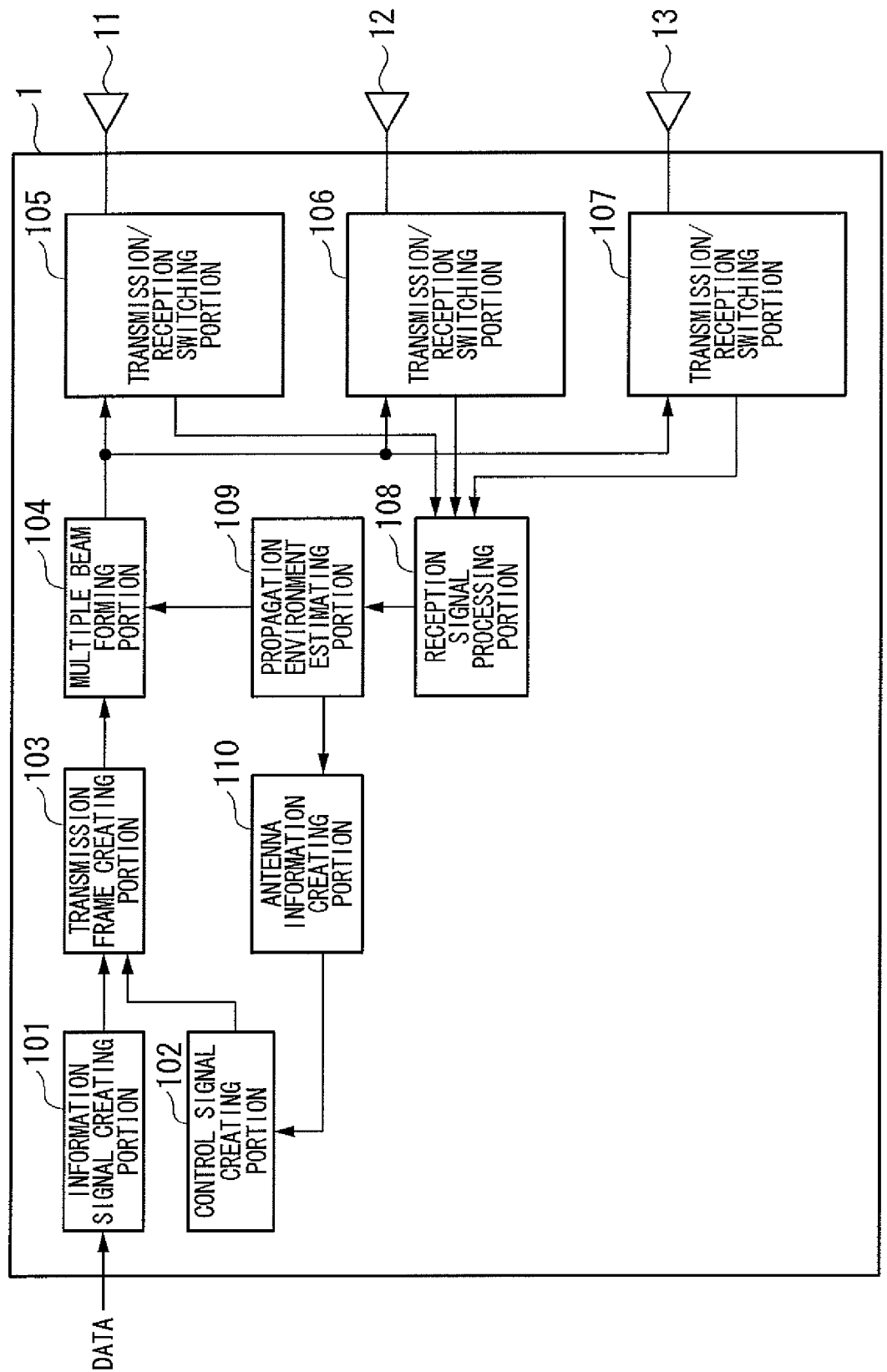
FIG. 2 is a block diagram of a base station 1 according to the same embodiment.

FIG. 2 is a block diagram of the base station 1 of the first embodiment. As is shown in FIG. 2, the base station 1 is provided with an information signal generating portion 101, a control signal generating portion 102, a transmission frame generating portion 103, a multiple beamforming portion 104, transmission/reception switching portions 105 through 107, a reception signal processing portion 108, a propagation environment estimating portion 109, and an antenna information generating portion 110. Moreover, the transmission/reception switching portion 105 is connected to the antenna 11, the transmission/reception switching portion 106 is connected to the antenna 12, and the transmission/reception switching 107 is connected to the antenna 13. In order to simplify the description, in FIG. 2, an example is described in which there are three antenna elements 11 through 13, however, it is also possible to increase the number of transmission/reception switching portions in accordance with the number of antenna elements. Moreover, the wireless station 1 is, for example, a wireless LAN base station or the like.

The information signal generating portion 101 receives inputs of data from outside the base station 1, and generates information signals using the input data. It also outputs generated information signals to the transmission frame generating portion 103.

The control signal generating portion 102 generates control signals that are based on the antenna information output by the antenna information generating portion 110, and outputs the generated control signals to the transmission frame generating portion 103. The antenna information includes information showing which antennas from the antennas belonging to each of the terminal stations 2 and 3, which are the transmission destinations, are to be used for receiving, and also includes information such as the center frequency to be used for communicating (for example, 5 GHz or 2.4 GHz), and the frequency band (for example, 20 MHz) and the like. The antenna information is set to M (which is≤N) number of antenna elements from the N number (which is a natural number of 2 or more) of antenna elements that belong to the terminal stations 2 and 3.

Furthermore, the control signal generating portion 102 receives command information commanding it to transmit a transmission request signal for a propagation environment estimation signal which is output by the antenna information generating portion 110, and, in accordance with the received command information commanding it to transmit a transmission request signal for a propagation environment estimation signal, generates a control signal that contains a transmission request signal for a propagation environment estimation signal, and outputs the generated control signal to the transmission frame generating portion 103.

The transmission frame generating portion 103 receives both the information signal output by the information signal generating portion 101 and a control signal output by the control signal generating portion 102, and generates a transmission frame signal using the received information signal and control signal. It then outputs the generated transmission frame signal to the multiple beamforming portion 104.

Note that the transmission frame signal generates a frame signal by attaching the control signal to the front of the information signal. Because the location of the control signal is optional, it is also possible for it to be attached, for example, to the center or rear of the frame, or it may be distributed throughout the frame and then transmitted. The control signal can also be sent in a separate frequency band or on a separate subcarrier. Furthermore, if code division multiplexing is used, the control signal may be sent by means of a different spreading code from that of the information frame.

The multiple beamforming portion 104 receives the transmission frame signal output by the transmission frame generating portion 103, and based on the received transmission frame signal, forms beamforming signals to be transmitted from the antennas 11 through 13 to the terminal stations 2 and 3. It then outputs the formed beamforming signals to the transmission/reception signal switching portions 105 through 107. The multiple beamforming portion 104 also receives propagation environment information output by the propagation environment estimating portion 109, and, based on the received propagation environment information and transmission frame signal, forms beamforming signals, and then outputs the formed beamforming signals to the transmission/reception switching portions 105 through 107. For example, as is shown in FIG. 1, it performs beamforming that are output from the antennas 11 and 12 to the terminal station 2, and also performs beamforming so as to output from the antenna 13 to the terminal station 2.

The transmission/reception switching portions (i.e., transmission switching/reception processing portions) 105 through 107 are provided with a DAC (digital-to-analog converter) and an ADC (analog-to-digital converter), and with an automatic gain control portion. Moreover, the transmission/reception switching portions 105 through 107 receive the beamforming signals output by the multiple beamforming portion 104, and split the received beamforming signals. They then convert them into analog signals using the DAC, and then transmit these to the terminal stations 2 and 3 via the antennas 11 through 13 that are connected to the transmission/reception switching portions 105 through 107. Furthermore, the transmission/reception switching portions 105 through 107 also convert reception signals received from the terminal stations 2 and 3 via the antennas 11 through 13 into digital signals using the ADC, and then output them to the reception signal processing portion 108.

The reception signal processing portion 108 receives the reception signals output by the transmission/reception switching portions 105 through 107, and extracts various signal types from the received reception signals via predetermined filters and the like. It then outputs the extracted signal types to the propagation environment estimating portion 109.

The propagation environment estimating portion (i.e., a first propagation environment estimating portion) 109 receives the various signal types that are output by the reception signal processing portion 108, and generates propagation environment information using the received various signal types. It then outputs the generated propagation environment information to the multiple beamforming portion 104 and the antenna information generating portion 110. The propagation environment estimating portion 109 also calculates the reception level of the received various signal types, and calculates a signal-to-noise power (either including interference power or not including interference power) ratio, or else calculates a signal-to-interference power ratio, and outputs the calculated signal-to-noise power ratio or signal-to-interference power ratio to the antenna information generating portion 110. Furthermore, the propagation environment estimating portion 109 also calculates the total transmission capacity within a predetermined time of the respective antennas 11 through 13 of the terminal stations 2 and 3, and outputs the calculated total transmission capacities of the respective antennas 11 through 13 to the antenna information generating portion 110. Furthermore, the propagation environment estimating portion 109 also extracts the propagation environment estimation signal from the various signal types, and using the extracted propagation environment estimation signal, estimates a transfer function for the respective antennas 11 through 13 of the terminal stations 2 and 3 based on known signals and the like. It then outputs the estimated transfer function to the multiple beamforming portion 104 and the antenna information generating portion 110.

The antenna information generating portion (i.e., a first antenna information generating portion) 110 receives the propagation environment information output by the propagation environment estimating portion 109 and, using the received propagation environment information, decides which of the antennas 11 through 13 are to be used for receiving by the terminal stations 2 and 3. It then outputs the decided antenna information to the control signal generating portion 102. If propagation environment information is not output from the propagation environment estimating portion 109, the antenna information generating portion 110 decides which of the respective antennas 11 through 13 of the terminal stations 2 and 3 are to be used for receiving based on predetermined values. Alternatively, if propagation environment information is output from the propagation environment estimating portion 109, the antenna information generating portion 110 decides which of the respective antennas 11 through 13 of the terminal stations 2 and 3 are to be used for receiving based on the transfer function which forms the received propagation environment information from the respective antennas 11 through 13 of the terminal stations 2 and 3. Another option is for the antenna information generating portion 110 to decide the antenna to be used for receiving based on the signal-to-noise power ratio or signal-to-interference power ratio, or based on the total transmission capacities of the respective antennas 11 through 13. Moreover, if, for example, the terminal station 2 has a smaller total transmission capacity than the terminal station 3, then based on the respective total transmission capacities of the respective antennas 11 through 13 of the terminal stations 2 and 3, the antenna information generating portion 110 decides the antennas such that the transmission capacity of the terminal station having the smallest transmission capacity is increased. Furthermore, if the antenna information generating portion 110 has extracted antenna information from the signals received by the terminal stations 2 and 3, then it may decide the antennas in accordance with the extracted antenna information. Furthermore, in cases such as when a signal is not received from the terminal stations 2 and 3, the antenna information generating portion 110 generates command information commanding that a transmission request signal for a propagation environment estimation signal be transmitted, and then outputs to the control signal generating portion 102 the generated command information commanding that a transmission request signal for a propagation environment estimation signal be transmitted.

Figure 3:
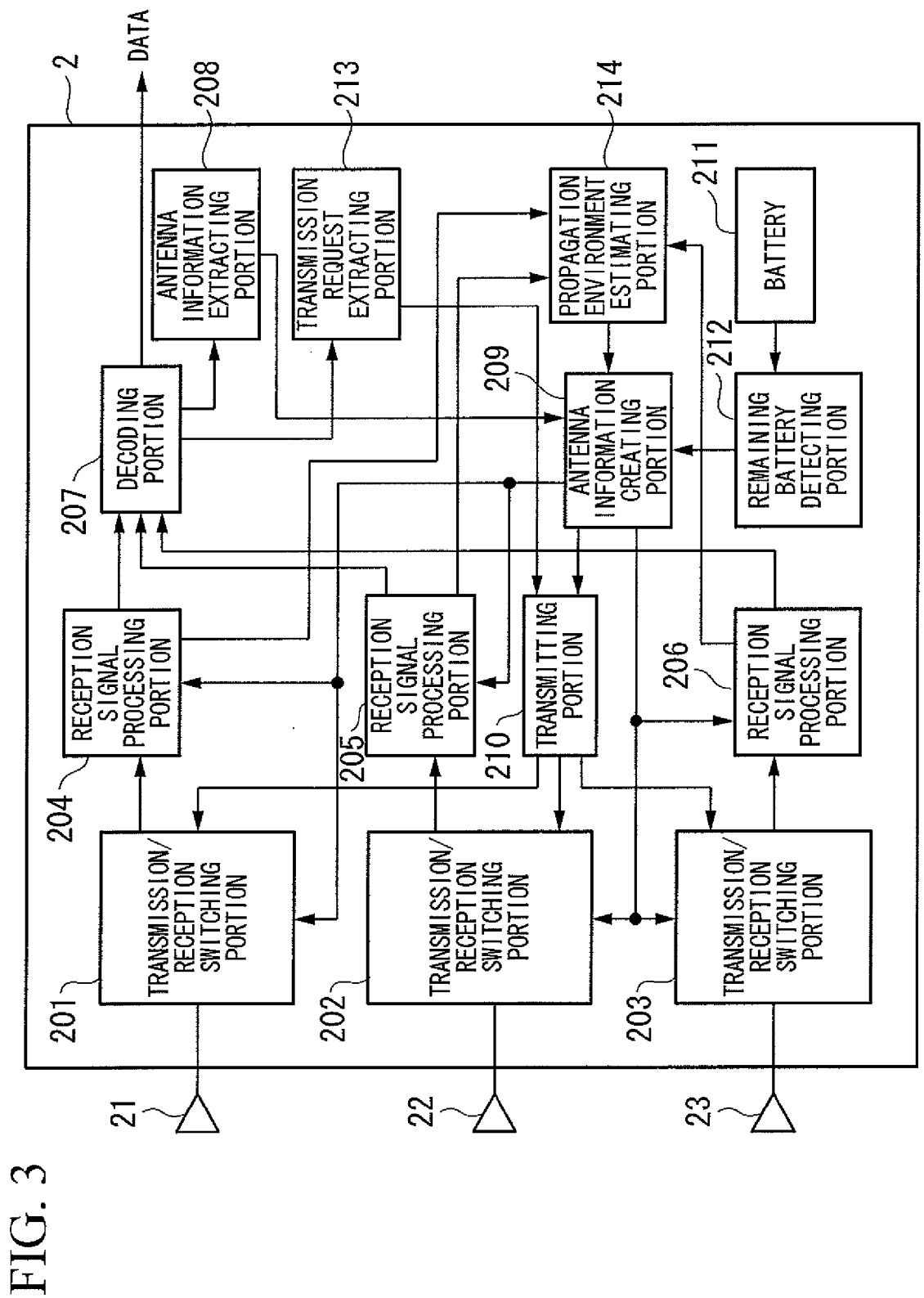
FIG. 3 is a block diagram of a terminal station 2 according to the same embodiment.

FIG. 3 is a block diagram showing the terminal station 2 according to the first embodiment. Note that the structure of the terminal station 3 is the same type of structure as that of the terminal station 2. As is shown in FIG. 3, the terminal station 2 is provided with transmission/reception switching portions 201 through 203, reception signal processing portions 204 through 206, a decoding portion 207, an antenna information extracting portion 208, an antenna information generating portion 209, a transmitting portion 210, a battery 211, a remaining battery detecting portion 212, a transmission request extracting portion 213, and a propagation environment estimating portion 214. The transmission/reception switching portion 201 is connected to the antenna 21, the transmission/reception switching portion 202 is connected to the antenna 22, and the transmission/reception switching portion 203 is connected to the antenna 23. Moreover, in order to simplify the description, in FIG. 3 an example is described in which there are three antenna elements 21 through 23, however, it is also possible to increase the number of transmission/reception switching portions and reception signal processing portions in accordance with the number of antenna elements.

The transmission/reception processing portions (i.e., transmission switching/reception processing portions) 201 through 203 are provided with a DAC and an ADC, and with an automatic gain control portion. Moreover, the transmission/reception switching portions 201 through 203 receive transmission signals output by the transmitting portion 210, and split the received transmission signals. They then convert them into analog signals using the DAC, and then transmit these to the base station 1 via the antennas 21 through 23 that are connected to the transmission/reception switching portions 201 through 203. Furthermore, the transmission/reception switching portions 201 through 203 also convert reception signals received from the base station 1 via the antennas 21 through 23 into digital signals using the ADC, and then output them to the reception signal processing portions 204 through 206.

The reception signal processing portions 204 through 206 receive the reception signals output by the transmission/reception switching portions 201 through 203, and extract control signals and information signals from the received reception signals using predetermined filters and the like. They then output the extracted control signals and information signals to the decoding portion 207 and the propagation environment estimating portion 214. The reception signal processing portions 204 through 206 also turn the circuit power supply on or off using power supply control signals output by the antenna information generating portion 209, or else they vary the clocks of the circuits which are performing the processing so that they match the frequency bands being used for the communication, for example, from 20 MHz through 80 MHz.

The decoding portion 207 receives the control signals and information signals output by the reception signal processing portions 204 through 206, and decodes the received control signals. It then outputs them to the antenna information extracting portion 208 and the transmission request extracting portion 213. In addition, the decoding portion 207 decodes the received information signals and outputs them to the image display portion and audio playback portion (neither are shown) of the terminal station 2.

The antenna information extracting portion 208 receives the control signals output by the decoding portion 207, and extracts the antenna information from the received control signals. When it has extracted antenna information, it outputs the extracted antenna information to the antenna information generating portion 209.

The antenna information generating portion (i.e., a second antenna information generating portion and control portion) 209 receives the antenna information output by the antenna information extracting portion 208 and the propagation environment information output by the propagation environment estimating portion 214, and, based on the received antenna information and propagation environment information, it selects which of the antennas 21 through 23 are to be used for receiving, and generates antenna specifying information. Moreover, based on the remaining battery information about the battery 211 which is output by the remaining battery detecting portion 212, if, for example, the remaining battery is 70% or more, the antenna information generating portion 209 selects 3 as the number of antennas, while if the remaining battery is between 30% and 70%, it selects 2 as the of antennas, and if the remaining battery is less than 30%, it selects 1 as the number of antennas, and generates antenna specifying information. Furthermore, the antenna information generating portion 209 receives the propagation environment information output by the propagation environment estimating portion 214, and, using the received propagation environment information, selects an order of priority for the antennas as well as the number of antennas, or else selects either an order of priority for the antennas or the number of antennas, and generates antenna specifying information. For example, the antenna information generating portion 209 may raise the order of priority for antennas having a high reception level, or may compare the reception level with a predetermined threshold value and then select those antennas having a reception level that is higher than the predetermined threshold value, or may select antennas having little interference, and then generates antenna specifying information. Furthermore, when the antenna information generating portion 209 is generating information of the number of antennas to be used for receiving and their order of priority, it generates antenna specifying information specifying that antennas having different polarizations be used alternatingly. Furthermore, the antenna information generating portion 209 selects the number of antennas to be used so as to match the frequency band being used for the communication, and then generates the antenna specifying information. For example, if there are 8 antenna elements, then for communication in a 20 MHz band, it sets the number of antennas as 8, while for communication in a 40 MHz band, it sets the number of antennas as 4, and for communication and 80 MHz band, it sets the number of antennas as 2. Furthermore, when the antenna information generating portion 209 is deciding the order of priority of the antennas being used for receiving, it selects the order of priority while considering the distance (i.e., the interval) between antennas. For example, if 8 antenna elements are arranged at equal intervals in order from n1 to n8 (not shown) and 3 elements are to be selected, then instead of selecting the adjacent antennas n1, n2, and n3, for example, the antennas n1, n4, and n8 are selected so that, out of the combinations that it is possible to select, the largest possible value is obtained for the shortest distance between the antennas. Note that the distances between the respective antennas 11 through 13 are stored in advance in the antenna information generating portion 209.

The transmitting portion 210 receives the transmission request signal for a propagation environment estimation signal which is output by the transmission request extracting portion 213, and outputs propagation environment estimation signals to the transmission/reception switching portions 201 through 203 in accordance with the received transmission request signal for a propagation environment estimation signal. Moreover, based on the antenna specifying information output by the antenna information generating portion 209, the transmitting portion 210 outputs to the transmitting/receiving switching portions 201 through 203 either the order of priority of the antennas to be used for receiving by the terminal station 2 or the number of these antennas, or else it outputs the order of priority of these antennas as well as the number of the antennas.

The battery 211 supplies power to each circuit portion of the terminal station 2, and is formed, for example, by a primary battery or by a rechargeable battery or the like.

The remaining battery detecting portion 212 detects the remaining battery capacity of the battery 211, and outputs the detected remaining battery capacity information to the antenna information generating portion 209. For example, the remaining battery detecting portion 212 outputs to the antenna information generating portion 209 remaining battery information such as whether the remaining capacity of the battery 211 is 70% or more, whether it is between 70% and 30%, or whether it is less than 30%.

The transmission request extracting portion 213 receives control signals output by the decoding portion 207, and extracts the transmission request signal for a propagation environment estimation signal from the received control signals. When it has extracted the transmission request signal, it outputs the extracted transmission request signal for a propagation environment estimation signal to the transmitting portion 210.

The propagation environment estimating portion (i.e., a second propagation environment estimating portion) 214 receives the control signals and information signals output by the reception signal processing portions 204 through 206, and based on the received control signals and information signals, it calculates the reception level and interference state for each of the antennas 21 through 23. It then outputs the calculated reception levels and interference states to the antenna information generating portion 209 as propagation environment information.

Figure 4:
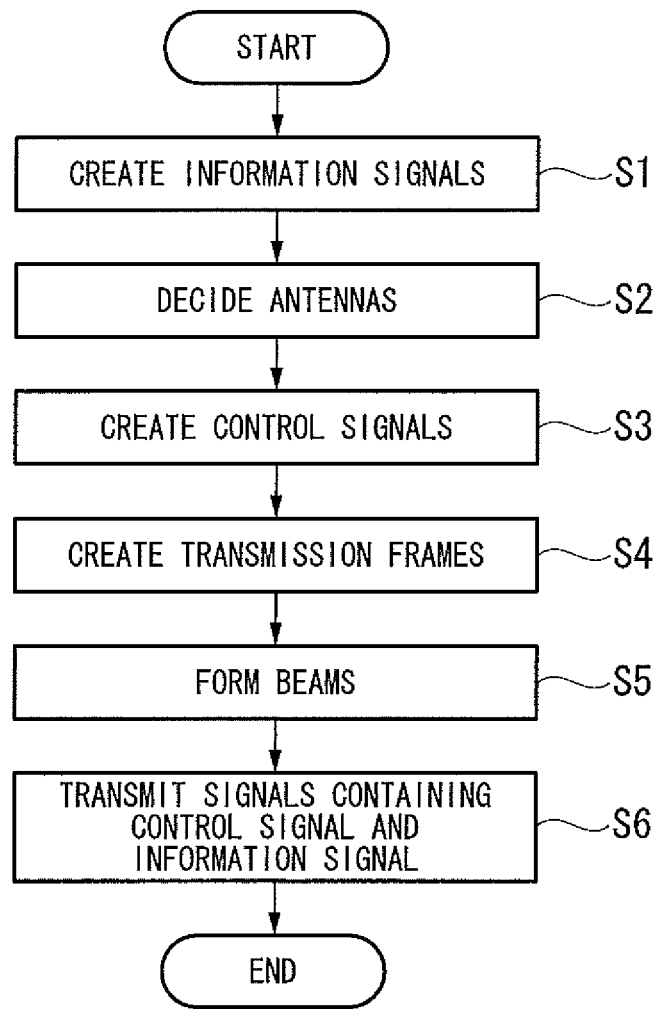
FIG. 4 is a flowchart showing a routine for transmitting from the base station 1 to terminal stations 2 and 3 according to the same embodiment.

Next, the procedure for making a transmission from the base station 1 to the terminal station 2 and the terminal station 3 of the first embodiment will be described using the flowchart shown in FIG. 4. Firstly, the information signal generating portion 101 of the base station 1 receives from outside the base station 1 the data that is to be transmitted to the terminal station 2 and the terminal station 3. Based on the received data, it then generates an information signal, and outputs the generated information signal to the transmission frame generating portion 103 (step S1).

Next, because no transmission has been received from the terminal station 2 and the terminal station 3, the antenna information generating portion 110 decides on predetermined antennas for the terminal antennas 2 and 3, which have been decided in advance, and outputs the decided antenna information to the control signal generating portion 102 (step S2).

Next, the control signal generating portion 102 receives the antenna information output by the antenna information generating portion 110, and generates a control signal based on the received antenna information. It then outputs the generated control signal to the transmission frame generating portion 103 (step S3). For example, as is shown in FIG. 1, a control signal is generated that contains antenna information indicating that the terminal station 2 is to receive transmissions from the base station 1 using the antennas 21 and 23, and that the terminal station 3 is to receive transmissions from the base station 1 using the antenna 32.

Next, the transmission frame generating portion 103 receives the information signal output by the information signal generating portion 101 and the control signal output by the control signal generating portion 102, and based on the received information signal and control signal, generates transmission frame signals for the terminal stations 2 and 3. It then outputs the generated transmission frame signals for the terminal stations 2 and 3 to the multiple beamforming portion 104 (step S4).

Next, the multiple beamforming portion 104 receives the transmission frame signals for the terminal stations 2 and 3 output by the transmission frame generating portion 103, and based on the received transmission frame signals for the terminal stations 2 and 3, for example, performs beamforming for transmissions to be made to the terminal station 2 via the antennas 11 and 12, and performs beamforimng for a transmission to be made to the terminal station 3 via the antenna 13. It then outputs the formed beamforming signals to the transmission/reception switching portions 105 through 107 (step S5).

Next, the respective transmission/reception switching portions 105 through 107 receive the beamforming signals output by the multiple beamforming portion 104, and split the received beamforming signals. They then convert the beamforming signals into analog signals using their DAC, and transmit these analog signals to the terminal stations 2 and 3 via the antennas 11 through 13 that are connected to the transmission/reception switching portions 105 through 107 (step S6).

Figure 5:
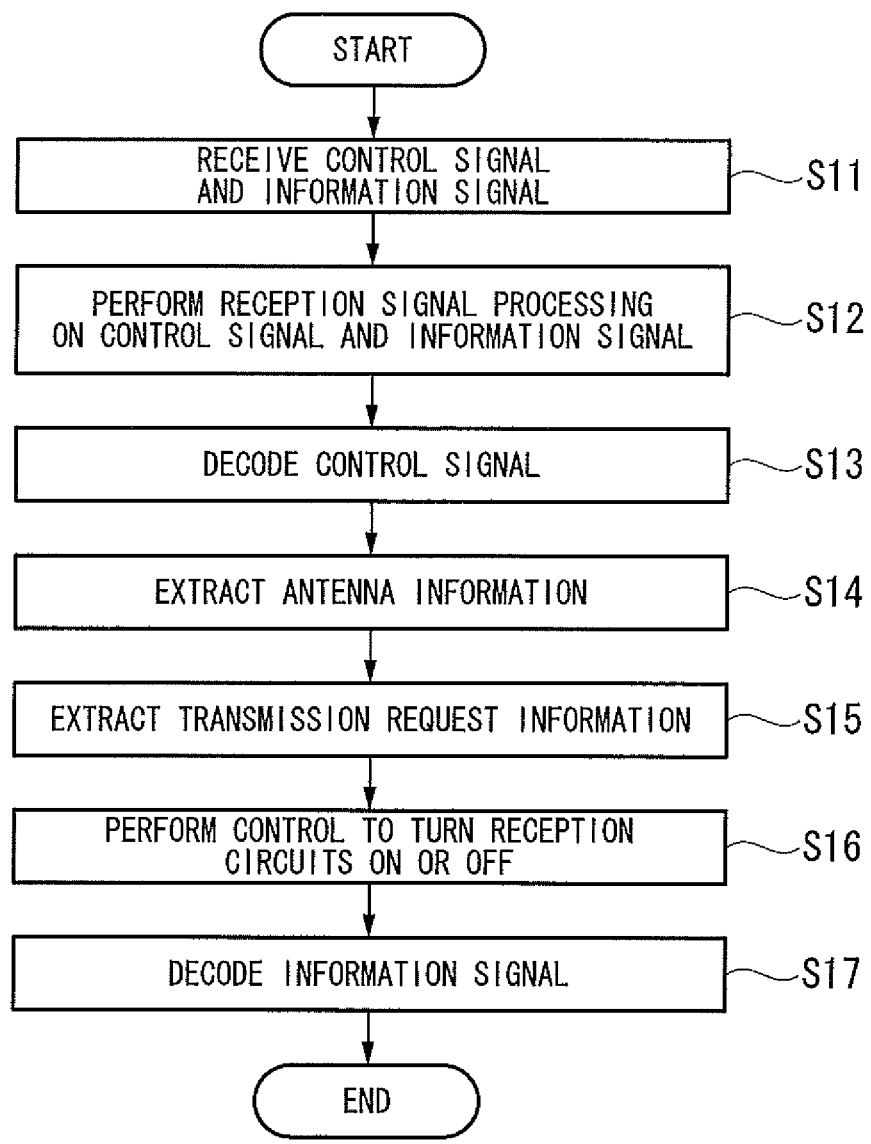
FIG. 5 is a flowchart showing a routine for receiving from the base stations 2 and 3 according to the same embodiment.

Next, the receiving procedure performed by the terminal station 2 will be described using the flowchart shown in FIG. 5. Firstly, the transmission/reception switching portions 201 through 203 of the terminal station 2 receive the signals containing the control signals and information signals from the base station 1 via the antennas 21 through 23, and output the received signals to the reception signal processing portions 204 through 206 (step S11).

Next, the reception signal processing portions 204 through 206 receive the signals output by the transmission/reception switching portions 201 through 203, and extract the control signals and information signals by using predetermined filters and the like on the received signals. They then output the extracted control signals and information signals to the decoding portion 207 (step S12).

Next, the decoding portion 207 receives the control signals and information signals output by the reception signal processing portion 204, and decodes the received control signals. It then outputs the decoded control signals to the antenna information extracting portion 208 and the transmission request extracting portion 213 (step S13).

Next, the antenna information extracting portion 208 extracts the antenna information from the received control signals, and if it has been able to extract antenna information, outputs the extracted antenna information to the antenna information generating portion 209 (step S14).

The transmission request extracting portion 213 extracts transmission request signal information from the received control signals, and if it has been able to extract transmission request signal information, outputs the extracted transmission request signal information to the transmitting portion 210 (step S15). In the first embodiment, only antenna information is contained in the control information, and transmission request signal information is not contained therein.

Next, the antenna information generating portion 209 receives the antenna information output by the antenna information extracting portion 208, and based on the received antenna information, switches the circuits of the transmission/reception switching portions 201 through 203 and reception signal processing portions 204 through 206 which are to be used for the decoding to either on or off (step S16). For example, as is shown in FIG. 1, if the antenna information indicates that signals are to be received using the antennas 21 and 23, the antenna information generating portion 209 switches off the circuits of the transmission/reception switching portion 202 and the reception signal processing portion 205, and switches on the circuits of the transmission/reception switching portions 201 and 203, and also switches on the circuits of the reception signal processing portions 204 and 206. Note that the mode in which, based on the antenna information, the transmission/reception switching portions and the reception signal processing portions which are connected to the antennas to be used for receiving, and which are to be used for decoding are turned on is a receiving mode, while the mode in which the transmission/reception switching portions and the reception signal processing portions which are connected to the antennas which are not to be used for receiving, and which are not to be used for decoding are turned off is a non-receiving mode.

Next, the decoding portion 207 receives the information signals output by the reception signal processing portions 204 and 206, and decodes the received information signals. The data that is based on the decoded information signals is then displayed, for example, on an image display portion (not shown) of the terminal station 2, or may be output to a speaker (not shown), and played back (step S17).

The terminal station 3 receives the signals containing the control signals and information signals from the base station 1, and performs step S11 through step S17 in the same way. For example, if a signal contains antenna information indicating that antenna 32 is to be used for the receiving, the antenna information generating portion 209 turns off the circuits of the transmission/reception switching portions 201 and 203, and turns off the circuits of the reception signal processing portions 204 and 206, and also turns on the circuit of the transmission/reception switching portion 202, and turns on the circuit of the reception signal processing portion 205. The antenna information generating portion 209 then receives and decodes the information signal.

As is described above, according to the first embodiment, during communication, antenna information to be used for receiving is transmitted as a control signal from the base station 1 to the terminal stations 2 and 3, and, in accordance with the received control signal, the respective terminal stations 2 and 3 turn on only the circuits of the transmission/reception circuits 201 through 203 and of the reception signal processing circuits 204 through 206 that are to be used for decoding. As a result, it is possible to reduce the consumption current of the respective terminal stations 2 and 3.

Moreover, in the first embodiment an example has been described in which signals that include control signals and information signals are received using all of the antennas 21 through 23 of the terminal station 2, however, it is also possible for just one antenna element or two antenna elements or the like to be used. For example, if the number of spatial multiplexes in the control signal is one or two, then it is possible to decode the control signal using one or two or more antenna elements. In particular, when the control signals are transmitted to the respective terminal stations at different timings, then even if the number of antennas that are operated for the receiving by the terminal stations is decreased, it is still possible for the control signal portions to be decoded. In cases such as this, the number of antennas used to receive the control signals may be fewer than the number of antennas used to receive the information signals. Namely, if the terminal station 2 has N number (wherein N is a natural number of 2 or more) of antenna elements, and M (N) is transmitted from the base station 1 to the terminal station 2 as antenna information for the control signal used for the receiving, the base station 1 transmits the information signals to the terminal station 2 such that the terminal station 2 is able to receive them using M (<N) number of antenna elements.

Moreover, if the control signals are to be attached to the front of the information signals before they are transmitted, then, firstly, in order to receive the control signals, the terminal stations 2 and 3 cause the automatic gain control portions of the transmission/reception switching portions 201 through 203 to operate for the antennas 21 through 23, or for the antennas 31 through 33, and receive the control signals. After the control signals have been received, the number of antennas used to receive the information signals is increased to more than the number of antennas used to receive the control signals, and if the antennas 21 through 23 which were not used to receive the control signals are used to receive the information signals, the transmission/reception switching portions 201 through 203 are controlled such that they have the same gain as the gain of the automatic gain control when the control signals were being received. By controlling the automatic gain control portions of the transmission/reception switching portions 201 through 203 in this manner, it is no longer necessary to wait for the automatic gain control to converge in order for the information signals to be received, so that, as a result, rapid signal processing becomes possible.

(Second Embodiment)

Figure 6:
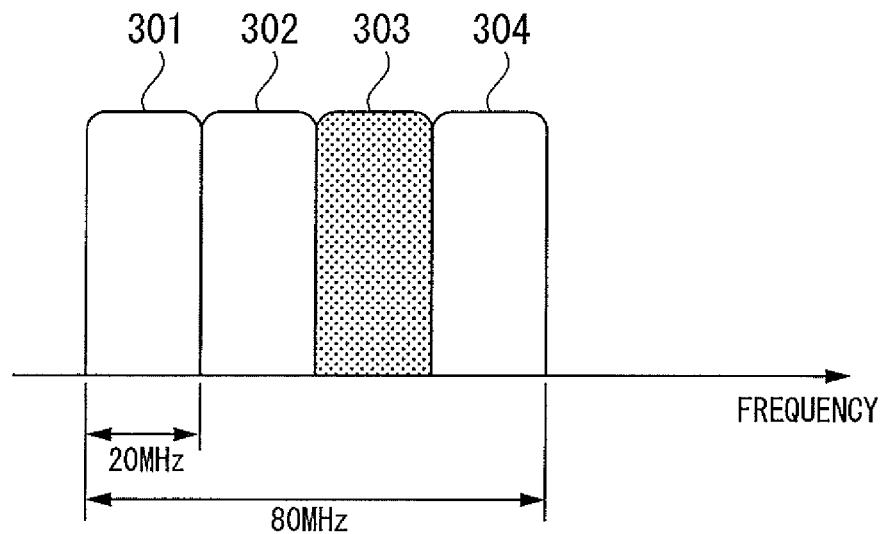
FIG. 6 is a view illustrating frequency bands according to a second embodiment.

Next, a second embodiment will be described using FIG. 2 and FIG. 3, and using the diagram in FIG. 6 explaining frequency bands. A case is described in which, as is shown in FIG. 6, communication between the base station 1 and the terminal stations 2 and 3 is performed using four 20 MHz bandwidths (=80 MHz). When control signals and information signals are spatially multiplexed and transmitted from the base station 1 to the terminal stations 2 and 3, it is necessary for the reception signal processing portions 204 through 206 of the terminal stations 2 and 3 to divide the spatially multiplexed signals between each of the frequency bands before processing them. Because of this, even if, for example, only the band 303 is being used for communication, the other bands 301, 302, and 304 also need to perform reception signal processing, and if the circuits of the bands that are not being used for communication are turned off, then the amount of power consumed can be decreased even further. Consequently, in the second embodiment, the transmission band information used for communication is shared by the base station 1 and the terminal stations 2 and 3.

Firstly, the control signal generating portion 102 of the base station 1 generates control information which includes the antenna information output by the antenna information generating portion 110 and also the frequency band to be used for the communication. Thereafter, in the same way as in the first embodiment, step S4 through step S6 are performed, and signals which include the control signals and information signals are transmitted to the terminal stations 2 and 3.

Next, the decoding portion 207 of the terminal station 2 receives the control signals and information signals output by the reception signal processing portions 204 through 206, and decodes the received control signals. It then outputs the decoded control signals to the antenna information extracting portion 208 and the transmission request portion 213. The antenna information extracting portion 208 receives the control signals output by the decoding portion 207, and extracts the transmission band information from the received control signals. It then outputs the extracted transmission band information to the antenna information generating portion 209.

Next, the antenna information generating portion 209 receives the transmission band information output by the antenna information extracting portion 208, and in accordance with the received transmission band information, turns on the transmission/reception switching portions 201 through 203 and reception signal processing portions 204 through 206 of the frequency bands to be used for the communication, and also turns off the circuits of the frequency bands that are not going to be used for the communication. For example, if information showing that only the band 303 is to be used for the communication is extracted from the control information, the antenna information generating portion 209 only turns on the circuit of the band 303, and turns off the circuits of the other bands 301, 302, and 304.

As is described above, according to the second embodiment, the frequency bands to be used for communicating are included within control signals that are transmitted from the base station 1 to the respective terminal stations 2 and 3 at the time of the communication, and in accordance with the received control signals, the respective terminal stations 2 and 3 only turn on the circuits of the frequency bands that are to be used for the communication. As a result, it is possible to reduce the consumption current of the terminal stations 2 and 3.

Moreover, in the second embodiment, an example has been described in which only information about the transmission band which is to be used for communication is contained within the control signal, however, when there are multiple central frequencies such as 5 GHz and 2.4 GHz, as in the case of the wireless LAN standard, for example, then the center frequency information can also be included in the control signal when this is transmitted.

Moreover, in the second embodiment, an example is described in which the circuits of frequency bands that are not used for communication are turned off, however, for example, when communication is performed using only the frequency band 303, it is also possible to reduce the power consumption by dropping the frequency of the ADC and DAC of the transmission/reception switching portions 201 through 203 from 80 MHz to 20 MHz, or by dropping the processing clocks of the reception signal processing portions 204 through 206 to match the frequency bands.

Moreover, in the second embodiment, an example is described in which control signals and information signals are transmitted to the terminal stations 2 and 3 at the same timings, however, it is also possible for the control signals to be transmitted on a different beamforming signal from those used to transmit the information signals. For example, it is also possible for the control signals to be transmitted from the base station 1 to the terminal station 2 at a different timing, and for transmissions to be made in such a manner that there is no occurrence of interference rejection inflicted on other terminal stations.

[Third Embodiment]

Figure 7:
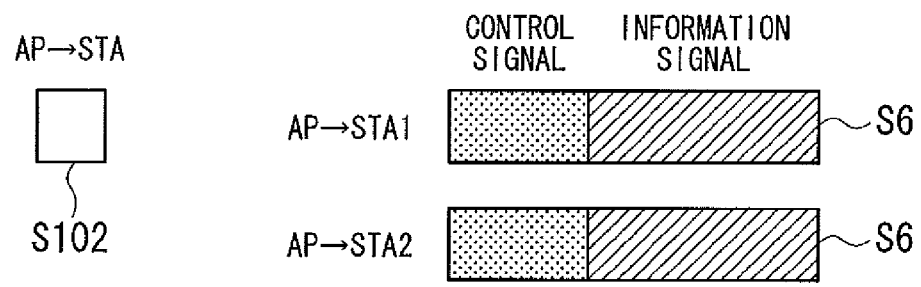
FIG. 7 is a timing chart showing transmissions and receptions between a base station and various terminal stations according to a third embodiment.
Figure 7:
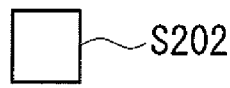
Figure 7:
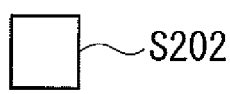
Figure 7:
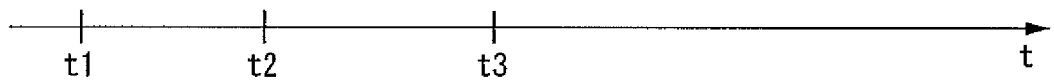
Figure 8:
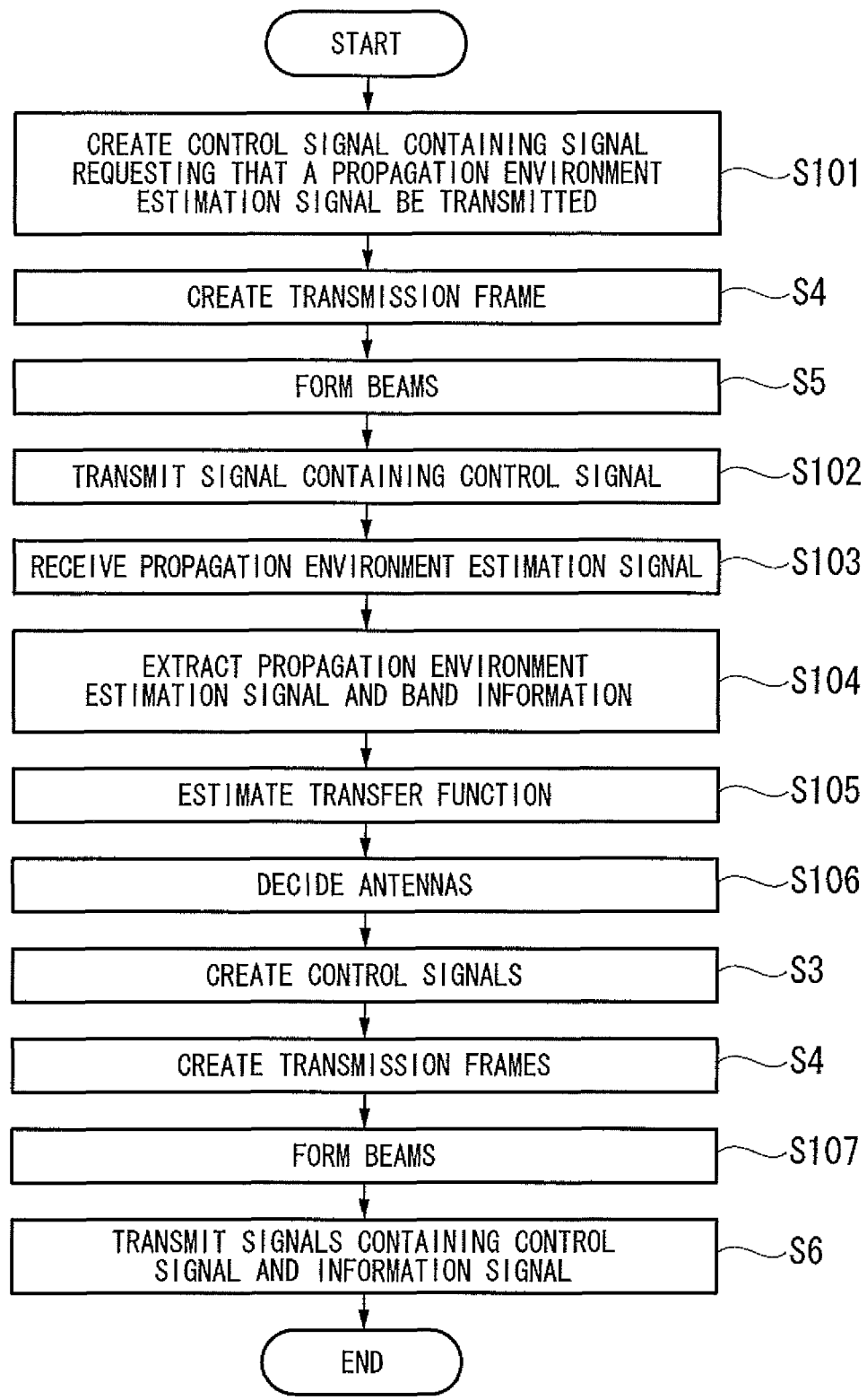
FIG. 8 is a flowchart showing a transmitting and receiving routine of the base station according to the same embodiment.
Figure 9:
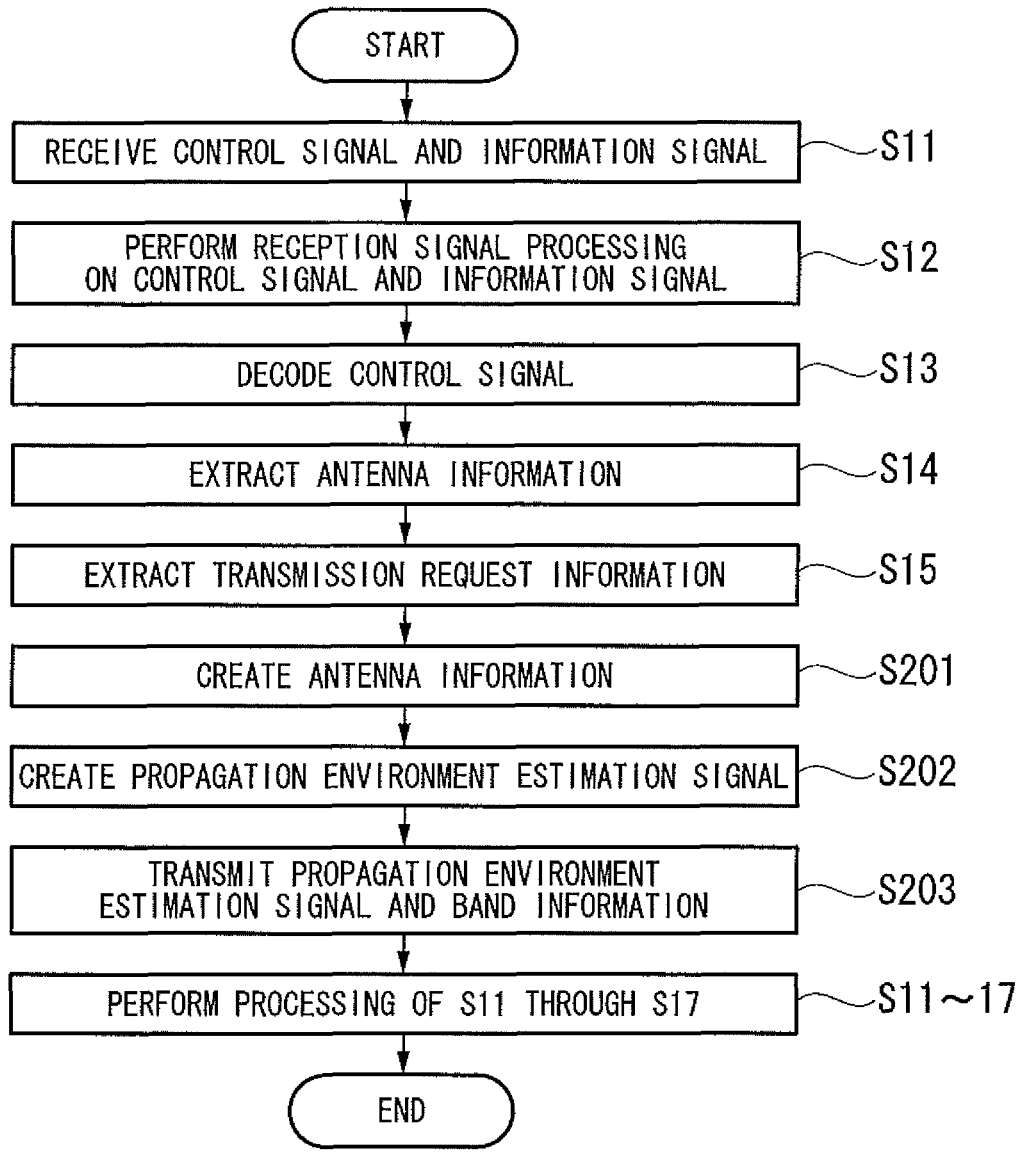
FIG. 9 is a flowchart showing a transmitting and receiving routine of a terminal station according to the same embodiment.

Next, a third embodiment will be described using FIG. 2 and FIG. 3, and FIG. 7 through FIG. 9. FIG. 7 is a timing chart showing transmissions and receptions between a base station and various terminal stations. FIG. 8 is a flowchart showing a transmitting and receiving routine of a base station. FIG. 9 is a flowchart showing a transmitting and receiving routine of a terminal station.

The difference between this embodiment and the first and second embodiments is that the antennas to be used for receiving are decided by estimating the propagation environment between the base station 1 and the terminal stations 2 and 3, and by then further performing a transmission beamforming process.

As is shown in FIG. 7 and FIG. 8, firstly, at a timing t1, in accordance with command information from the antenna information generating portion 110 commanding that a transmission request signal for a propagation environment estimation signal be transmitted, the control signal generating portion 102 generates a control signal that includes a transmission request signal for a propagation environment estimation signal, and outputs the generated control signal to the transmission frame generating portion 103 (step S101). Thereafter, step S4 through step S5 of the first embodiment of performed, and control signals are transmitted to the terminal stations 2 and 3 (step S102).

Next, in FIG. 9, the transmission/reception switching portions 201 through 203 of the terminal stations 2 and 3 receive the signals that contain the control signals via the antennas 21 through 23, and perform step S11 through step S14. In the third embodiment, only the transmission request signal information is contained in the control information, and the antenna information is not contained therein.

Next, the transmission request extracting portion 213 receives the control signal output by the decoding portion 207, and extracts the transmission request signal information from the received control signal. It then outputs the extracted transmission request signal information to the transmitting portion 210 (step S15).

Next, the reception signal processing portions 204 through 206 output the extracted control signals to the propagation environment estimating portion 214. The propagation environment estimating portion 214 receives the control signals output by the reception signal processing portions 204 through 206, and detects the reception level and interference state of the received control signals. Next, the propagation environment estimating portion 214 outputs the detected reception levels and interference states to the antenna information generating portion 209, and the antenna information generating portion 209 receives the reception levels and interference states output by the propagation environment estimating portion 214. Next, based on the received reception levels and interference states, the antenna information generating portion 209 decides the frequency band to be used for the transmission that is used to receive the control signals, and outputs the decided transmission band information to the transmitting portion 210 (step S201). For example, either the frequency band having the highest reception level is selected, or the frequency band having the least amount of interference is selected, and the terminal station 2 selects the frequency band 301, while the terminal station 3 selects the frequency band 303.

Next, the transmitting portion 210 receives the transmission request signal information output by the transmission request extracting portion 213, and the transmission band information output by the antenna information generating portion 209, and using the received transmission request signal information and transmission band information, it generates propagation environment estimation signals and transmission band information for the base station 1. The generated propagation environment estimation signals and transmission band information are then output to the transmission/reception switching portions 201 through 203 (step S202).

Next, the transmission/reception switching portions 201 through 203 receive the propagation environment estimation signals and transmission band information output by the transmitting portion 210, and transmit the received propagation environment estimation signals and transmission band information to the base station 1 at the timing t2 via the antennas 21 through 23 (step S203).

Next, returning to FIG. 8, the transmission/reception switching portions 105 through 107 of the base station 1 receive the respective propagation environment estimation signals and the respective transmission band information from the terminal stations 2 and 3 via the antennas 11 through 13, and output the respective propagation environment estimation signals and the respective transmission band information which they have received to the reception signal processing portion 108 (step S103).

Next, the reception signal processing portion 108 receives the respective elepropagation environment estimation signals and the respective transmission band information output by the transmission/reception switching portions 105 through 107, and uses a predetermined filter or the like to extract the received respective propagation environment estimation signals and the received respective transmission band information from the terminal stations 2 and 3. It then outputs the extracted respective propagation environment estimation signals and respective transmission band information to the propagation environment estimating portion 109 (step S104).

Next, the propagation environment estimating portion 109 receives the respective propagation environment estimation signals and the respective transmission band information output by the reception signal processing portion 108, and using a known method, estimates a transfer function for the received respective propagation environment estimation signals. The propagation environment estimating portion 109 then outputs the respective transmission band information and propagation environment information which it has received to the antenna information generating portion 110 and the multiple beamforming portion 104 (step S105).

Next, the antenna information generating portion 110 receives the propagation environment information output by the propagation environment estimating portion 109, and based on the received propagation environment information, decides which of the respective antennas are to be used for receiving by the terminal stations 2 and 3. Next, the antenna information generating portion 110 outputs the information about the respective antennas which it has decided will be used for receiving, and the received respective transmission band information to the control signal generating portion 102 (step S106).

Thereafter, step S3 and step S4 are performed.

Next, the multiple beamforming portion 104 receives the transmission frame signal output by the transmission frame generating portion 103, and the respective propagation environment information output by the propagation environment estimating portion 109. Next, based on the respective propagation environment information and the respective transmission band information that it has received, the multiple beamforming portion 104 performs beamforming for the transmission frame signals to the terminal stations 2 and 3, and outputs the formed beamforming signals to the transmission/reception switching portions 105 through 107 (step S107). For the beam forming method, an optional algorithm may be used such as, for example, maximal ratio combining, MMSE, or ZF.

Next, as is shown in FIG. 7, at the timing t3, the transmission/reception switching portions 105 through 107 firstly transmit the control signals and then transmit the information signals via the antennas 11 through 13 using the respective bands that are used for receiving the control signals by the base stations 2 and 3 (step S6). For example, the control signals are transmitted to the terminal station 2 using the frequency band 301, while the control signals are transmitted to the terminal station 3 using the frequency band 303.

Next, returning to FIG. 9, based on the transmission band information transmitted to the base station 1, the terminal station 2 uses, for example, the frequency band 301, and receives signals that contain the control signals while the circuits of the transmission/reception switching portions 201 through 203 and the reception signal processing portions 204 through 206, which are associated with unused transmission bands, are turned off. In addition, based on the transmission band information transmitted to the base station 1, the terminal station 3 uses, for example, the frequency band 303, and receives signals that contain the control signals while the circuits of the transmission/reception switching portions 201 through 203 and the reception signal processing portions 204 through 206, which are associated with unused transmission bands, are turned off.

Thereafter, in the same way as in the first embodiment, the transmission/reception switching portion 202 and the reception signal processing portion 205 perform step S11 through step S17 on the received control signals.

Next, the transmission/reception switching portions 201 through 203 receive the signals via the antennas 21 through 23 and the antennas 31 through 33 based on the antenna information used for receiving the information signals decided by the base station 1. They also receive the information signals while the circuits of the transmission/reception switching portions 201 through 203 and the circuits of the reception signal processing portions 204 through 205 which are not being used for receiving are turned off, and perform reception of the received information signals.

As is described above, according to the third embodiment, a transmission request for a propagation environment estimation signal is sent from the base station 1 to the terminal stations 2 and 3, and based on the transmission request for propagation environment estimation signals received from the base station 1, the terminal stations 2 and 3 transmit their respective propagation environment estimation signals, and also their respective transmission band information specifying the transmission bands to be used to receive the control signals. Next, based on the respective propagation environment estimation signals transmitted by the terminal stations 2 and 3, the base station 1 decides the respective antennas to be used by the terminal stations 2 and 3 to receive the information signals, and performs beamforming to be used for the transmissions. Next, the terminal stations 2 and 3 transmit the control signals in transmission frequency bands that correspond to the respective information relating to the transmission bands that are to be used to receive the control signals. Next, because the terminal stations 2 and 3 receive the control signals in the transmission bands that they themselves have specified, and the terminal stations 2 and 3 also receive the information signals using antennas which are based on the antenna information extracted from the control signals, and the terminal stations 2 and 3 receive these signals using the transmission/reception switching portions and the reception switching portions, even when the terminal stations 2 and 3 are receiving the control signals as well, they are able to receive the control signals using only the transmission bands that were specified previously. Consequently, it is possible to reduce the consumption current of the terminal stations 2 and 3.

Moreover, in the third embodiment, an example is described in which the antenna information is contained in the control signals, however, in the same way as in the second embodiment, it is also possible for the control signals to contain the frequency bands for receiving the information signals and information about center frequencies.

Furthermore, in the third embodiment, an example is described in which unused circuits of the transmission/reception switching portions 201 through 203 and of the reception signal processing portions 204 through 206 of the respective terminal stations are turned off when the control signals are being received, however, for example, when communication is performed using only the frequency band 303, it is also possible to reduce the power consumption by dropping the frequency of the ADC and DAC of the transmission/reception switching portions 201 through 203 from 80 MHz to 20 MHz, or by dropping the processing clocks of the reception signal processing portions 204 through 206 to match the frequency bands.

[Fourth Embodiment]

Next, a fourth embodiment will be described using FIG. 2 and FIG. 3. In the first embodiment, based on the antenna information contained in the control signals transmitted by the base station 1, the antenna information generating portions 209 of the terminal stations 2 and 3 turned the circuits to be used for decoding either on or off. Because it is necessary for the control signals to be transmitted from the base station 1 to the terminal stations 2 and 3 in this manner, the control signal overheads increase in size. Because of this, in the fourth embodiment, an order of priority for the antennas to be used for receiving is set in advance by the terminal stations 2 and 3, and the set antenna order of priority information is shared with the base station 1, thereby enabling the control signal overheads to be improved.

Because the operations of the terminal stations 2 and 3 are the same, only the terminal station 2 will be described here. Firstly, the transmission/reception switching portions 201 through 203 of the terminal station 2 receive signals which contain information signals from the base station 1 via the antennas 21 through 23, and output the received signals containing the information signals to the reception signal processing portions 204 through 206.

Next, the reception signal processing portions 204 through 206 receive the signals containing the information signals output by the transmission/reception switching portions 201 through 203, and extract the information signals using a predetermined filter or the like from the received signals containing the information signals. They then output the extracted information signals to the propagation environment estimating portion 214.

Next, the propagation environment estimating portion 214 receives the respective information signals output by the reception signal processing portions 204 through 206, and calculates a reception level for each of the received information signals. It then outputs the calculated respective reception level information to the antenna information generating portion 209.

Next, the antenna information generating portion 209 receives the respective reception level information output by the propagation environment estimating portion 214, and, using the received reception level information, calculates an order of priority for the antennas to be used for receiving. It then outputs the calculated antenna order of priority information (i.e., antenna specifying information) to the transmitting portion 210. Next, the transmitting portion 210 receives the antenna order of priority information output by the antenna information generating portion 209, and outputs the received antenna order of priority information to the transmission/reception switching portions 201 through 203. The transmission/reception switching portions 201 through 203 receive the antenna order of priority information output by the transmitting portion 210, and transmit the received antenna order of priority information to the base station 1 via the antennas 21 through 23.

Next, the transmission/reception switching portions 105 through 107 of the base station 1 receive the signals containing the antenna order of priority information via the antennas 11 through 13, and output the signals containing the received antenna order of priority information to the reception signal processing portion 108.

Next, the reception signal processing portion 108 receives the signals containing the antenna order of priority information output by the transmission/reception switching portions 105 through 107, and extracts the antenna order of priority information using a predetermined filter or the like from the received signals containing the antenna order of priority information. It then outputs the extracted antenna order of priority information to the propagation environment estimating portion 109.

Next, the propagation environment estimating portion 109 receives the antenna order of priority information output by the reception signal processing portion 108, and outputs the received antenna order of priority information to the antenna information generating portion 110.

Next, the antenna information generating portion 110 receives the antenna order of priority information output by the propagation environment estimating portion 109, and based on the received antenna order of priority information, decides only the number of antennas to perform decoding with the terminal station 2. It then outputs the decided number of antennas to the control signal generating portion 102.

Thereafter, step S3 through step S6 are performed in the same way as in the first embodiment.

As is described above, according to the fourth embodiment, the order of priority of the antennas to be used for decoding is calculated in accordance with the respective reception levels received by each antenna in each terminal station from the base station 1, and the calculated antenna order of priority information is transmitted to the base station 1. The base station 1 receives the antenna order of priority information transmitted by each terminal station, and based on the received antenna order of priority information, it decides only the number of antennas to perform decoding with each terminal station. The base station 1 then transmits only the decided number of antennas as control signals to each of the terminal stations, and each base station selects the antennas based on an order of priority that corresponds to the received number of antennas. As a result, in addition to reducing power consumption, it is also possible to considerably reduce overhead in the control signal.

Moreover, in the fourth embodiment, an example is described in which the order of priority of the antennas is calculated in accordance with the reception levels received by each of the antennas 21 through 23, however, it is also possible for the propagation environment estimating portion 214 to calculate the interference states of the signals received by the respective antennas 21 through 23 using a general method, and to use this information to calculate the order of priority of the antennas to be used for the decoding. Alternatively, it is possible for both the interference states and the reception levels to be calculated and for the order of priority of the antennas to be calculated using both the interference states and the reception levels.

Moreover, in the fourth embodiment, an example is described in which antenna order of priority information is transmitted from each terminal station, however, it is also possible for not only the order of priority, but for the number of antennas used for the decoding to also be transmitted, or for only the number of antennas to be used for the decoding to be transmitted. In this case, if, for example, the terminal stations 2 and 3 are operating on the battery 211, the remaining battery detecting portion 212 detects the remaining power in the battery 211 and compares it with a predetermined threshold value. The remaining battery detecting portion 212 then outputs the results of this comparison to the antenna information generating portion 209. By limiting the number of antennas in each terminal station in accordance with the remaining power in the battery 211 in this manner, and by sharing antenna order of priority information in advance with the base station 1, it is possible for the power supply of each terminal station to be used efficiently.

Moreover, in the present embodiment, the base station 1 is not limited to a fixed facility such as a building or the like, and may also be a mobile facility. Moreover, the terminal stations 2 and 3 are used in the above description, however, the number of terminal stations may be more than this, and the number of antennas of the terminal stations 2 and 3 may also be two or more elements.

Note that it is also possible to record a program that achieves the functions of each portion shown in FIG. 2 and FIG. 3 of the embodiments on a computer-readable recording medium, and for the processing of each portion to be performed by causing a computer system to read and execute the program recorded on this recording medium. Note that the term 'computer system' used here includes both OS and hardware such as peripheral devices and the like.

Moreover, if a WWW system is being employed, then the term 'computer system' may also include a homepage providing environment (or display environment).

Moreover, the term 'computer readable recording medium' also refers to portable media such as flexible disks, magneto-optical disks, ROM (Read Only Memory), and CD-ROM and the like, and storage devices such as USB memory which is connected via a USB (Universal Serial Bus) I/F (Interface), and hard disks that are built into a computer system. Furthermore, 'computer readable recording medium' includes devices that dynamically hold programs for a short time such as communication lines when the program is being transmitted via a network such as the Internet or via a communication circuit such as a telephone line, and also includes devices that hold a program for a fixed time such as the internal volatile memory in a computer system which forms the server or client when, as is described above, the program is transmitted via a network such as the Internet or via a communication circuit such as a telephone line. Moreover, the program may be one that performs a portion of the above functions, or may be one that performs the above functions in combination with a program that is already recorded on a computer system.

INDUSTRIAL APPLICABILITY

The present invention can be applied to wireless communication systems in which a base station and terminal stations perform wireless communication.

DESCRIPTION OF THE REFERENCE NUMERALS

1 . . . Base station
2 . . . Terminal station
11~13, 21~23 . . . Antennas
101 . . . Information signal generating portion
102 . . . Control signal generating portion
103 . . . Transmission frame generating portion
104 . . . Multiple beamforming portion
105~107, 201~203 . . . Transmission/reception switching portions
108, 204~206 . . . Reception signal processing portions
109, 214 . . . Propagation environment estimating portions
110, 209 . . . Antenna information generating portions
207 . . . Decoding portion
208 . . . Antenna information extracting portion
210 . . . Transmitting portion
211 . . . Battery
212 . . . Remaining battery detecting portion
213 . . . Transmission request extracting portion

The invention claimed is:

1. A spatial multiplexing wireless transmission system comprising:
a base station communicating with a plurality of terminal stations; and
a first terminal station included in the plurality of terminal stations that comprises a plurality of antenna elements, wherein
the base station comprises a first antenna information generating portion that, when data to be transmitted to the first terminal station is input from outside, generates antenna information showing which of the plurality of antenna elements is to be used to receive information signals, then attaches control signals including the antenna information to front of the information signals, and transmits the information signals to the first terminal via a transmitting/receiving portion, and wherein
the first terminal station comprises:
transmission/reception switching and reception processing portions provided for each of the plurality of antenna elements that switch between transmitting and receiving information signals, conduct a reception operation and conduct an extracting operation of the information signals and the control signals from reception signals received via corresponding antenna elements; and
a control portion that receives the antenna information from the control signals, and based on the antenna information, selects at least one antenna element between the plurality of antenna elements which is to be used to receive information signals, and then sets the transmission/reception switching and reception processing portion corresponding to the selected antenna element to a receiving mode, sets a gain as same gain as when receiving the control signals if antenna elements which were not used for receiving the control signals are used for receiving the information signals, and sets the transmission/reception switching and reception processing portions that correspond to the antenna elements that were not selected to a non-receiving mode.

2. The spatial multiplexing wireless transmission system according to claim 1, wherein
the base station further comprises:
a control signal generating portion that generates transmission request signals requesting that the first terminal station transmit a propagation environment estimation signal, and then transmits the transmission request signal to the first terminal station via the transmitting/receiving portion;
a first propagation environment estimating portion that, based on the propagation environment estimation signal received from the first terminal station, generates propagation environment information regarding the first terminal station; and
a beamforming portion that, based on the antenna information generated by the first antenna information generating portion based on the propagation environment information, decides the transmission directionality while suppressing interference between the plurality of terminal stations and performs transmission beamforming, and then transmits a beamforming signal via the transmitting/receiving portion, and wherein the terminal stations respectively comprise:
  a transmitting portion that receives the transmission request signal via the plurality of antenna elements, and generates the propagation environment estimation signal, and then transmits the propagation environment estimation signal to the base station via the plurality of antenna elements; and
  a decoding portion that receives the transmitted beamforming signal via the antenna elements corresponding to the transmission/reception switching and reception processing portions that have been set to the receiving mode, and decode the transmitted beamforming signal to generate data, and then output the data to a playback portion.

3. The spatial multiplexing wireless transmission system according to claim 2, wherein
  the terminal stations are further provided with:
  a second propagation environment estimating portion that estimates a propagation environment using the transmission request signal and generates second propagation environment information; and
  a second antenna information generating portion that, based on the second propagation environment information, generates antenna specifying information specifying the antennas to be used to receive the antenna information from the base station, and transmits the antenna specifying information to the base station via the plurality of antenna elements, and wherein
  the first antenna information generating portion generates the antenna information which corresponds to the antenna specifying information received via the transmitting/receiving portion.

4. The spatial multiplexing wireless transmission system according to claim 3, wherein, based on the second propagation environment information, the second antenna information generating portion generates at least one of an order of priority and a number of antennas as the antenna specifying information used for receiving the antenna information from the base station, and transmits the antenna specifying information to the base station via the plurality of antenna elements, and,
  based on at least one of the order of priority of the antennas and the number of the antennas which are indicated in the antenna specifying information received via the transmitting/receiving portion, the first antenna information generating portion generates the antenna information.

5. The spatial multiplexing wireless transmission system according to claim 4, wherein
  the terminal stations are further comprises remaining battery detecting portions that generate remaining battery information by detecting the remaining battery level in the terminal stations, and output the remaining battery information, and
  the second antenna information generating portion generates the antenna specifying information based on the remaining battery information.

6. The spatial multiplexing wireless transmission system according to claim 3, wherein
  the terminal stations are further comprises remaining battery detecting portions that generate remaining battery information by detecting the remaining battery level in the terminal stations, and output the remaining battery information, and
  the second antenna information generating portion generates the antenna specifying information based on the remaining battery information.

7. The spatial multiplexing wireless transmission system according to claim 3, wherein
  the first antenna information generating portion generates at least one of information showing a center frequency used for a communication and information showing a transmission frequency band as the antenna information, and,
  based on at least one of the information showing the center frequency used for a communication and the information showing a transmission frequency band which were extracted from the antenna information, the control portion controls at least one of the center frequency and the transmission frequency band of the plurality of antenna elements which have been set to either the receiving mode or the non-receiving mode.

8. The spatial multiplexing wireless transmission system according to claim 7, wherein, based on the second propagation environment information, the second antenna information generating portion generates at least one of an order of priority and a number of antennas as the antenna specifying information used for receiving the antenna information from the base station, and transmits the antenna specifying information to the base station via the plurality of antenna elements, and,
  based on at least one of the order of priority of the antennas and the number of the antennas which are indicated in the antenna specifying information received via the transmitting/receiving portion, the first antenna information generating portion generates the antenna information.

9. The spatial multiplexing wireless transmission system according to claim 8, wherein
  the terminal stations are further comprises remaining battery detecting portions that generate remaining battery information by detecting the remaining battery level in the terminal stations, and output the remaining battery information, and
  the second antenna information generating portion generates the antenna specifying information based on the remaining battery information.

10. The spatial multiplexing wireless transmission system according to claim 7, wherein
  the terminal stations are further comprises remaining battery detecting portions that generate remaining battery information by detecting the remaining battery level in the terminal stations, and output the remaining battery information, and
  the second antenna information generating portion generates the antenna specifying information based on the remaining battery information.

11. The spatial multiplexing wireless transmission system according to claim 2, wherein
  the first antenna information generating portion generates at least one of information showing a center frequency used for a communication and information showing a transmission frequency band as the antenna information, and,
  based on at least one of the information showing the center frequency used for a communication and the information showing a transmission frequency band which were extracted from the antenna information, the control portion controls at least one of the center frequency and the transmission frequency band of the plurality of antenna elements which have been set to either the receiving mode or the non-receiving mode.

12. The spatial multiplexing wireless transmission system according to claim 1, wherein
the first antenna information generating portion generates at least one of information showing a center frequency used for a communication and information showing a transmission frequency band as the antenna information, and,
based on at least one of the information showing the center frequency used for a communication and the information showing a transmission frequency band which were extracted from the antenna information, the control portion controls at least one of the center frequency and the transmission frequency band of the plurality of antenna elements which have been set to either the receiving mode or the non-receiving mode.

13. The spatial multiplexing wireless transmission system according to claim 12, wherein
the terminal stations are further comprises remaining battery detecting portions that generate remaining battery information by detecting the remaining battery level in the terminal stations, and output the remaining battery information, and
the second antenna information generating portion generates the antenna specifying information based on the remaining battery information.

14. A spatial multiplexing wireless transmission method in a spatial multiplexing wireless transmission system including a base station that communicates with a plurality of terminal stations, and a first terminal station that is included in the plurality of terminal stations and that has a plurality of antenna elements, comprising:
a step of, in the base station, generating antenna information showing which antenna elements of the plurality of antenna elements of the terminal stations are to be used to receive information signals from the base station;
a step of attaching control information including the antenna information to front of the information signals and transmitting the information signals to the terminal stations;
a step of receiving the antenna information at the terminal stations via the antenna elements;
a step of extracting the information signals and the control signals from reception signals;
a step of extracting the antenna information from the control signals;
a step of, based on the extracted antenna information, selecting the antenna elements to be used to receive the information signals; and
a step setting the selected antenna elements to a receiving mode, setting a gain equal to that of when receiving the control signals if antenna elements which were not used for receiving the control signals are used for receiving the information signals, and setting the antenna elements that were not selected to a non-receiving mode.

15. In a spatial multiplexing wireless transmission system including both a base station that communicates with a plurality of terminal stations and a first terminal station included in the plurality of terminal stations with a plurality of antenna elements, a non-transitory computer-readable recording medium storing a computer program comprising:
an instruction of receiving reception signals in which control signals including antenna information are attached to front of the information signals, wherein the antenna information shows which of the plurality of antenna elements of the terminal stations are to be used to receive information signals from the base station;
an instruction of extracting the information signals and the control signals from reception signals;
an instruction of extracting the antenna information from the control signals;
an instruction of selecting the antenna elements used to receive the information signals based on the extracted antenna information; and
an instruction of setting the selected antenna elements to a receiving mode, setting a gain equal to that of when receiving the control signals if antenna elements which were not used for receiving the control signals are used for receiving the information signals, and setting the antenna elements that were not selected to a non-receiving mode.

* * * * *